March 18, 1930.  F. C. FARNSWORTH  1,750,837
DRYING SYSTEM
Filed March 8, 1929
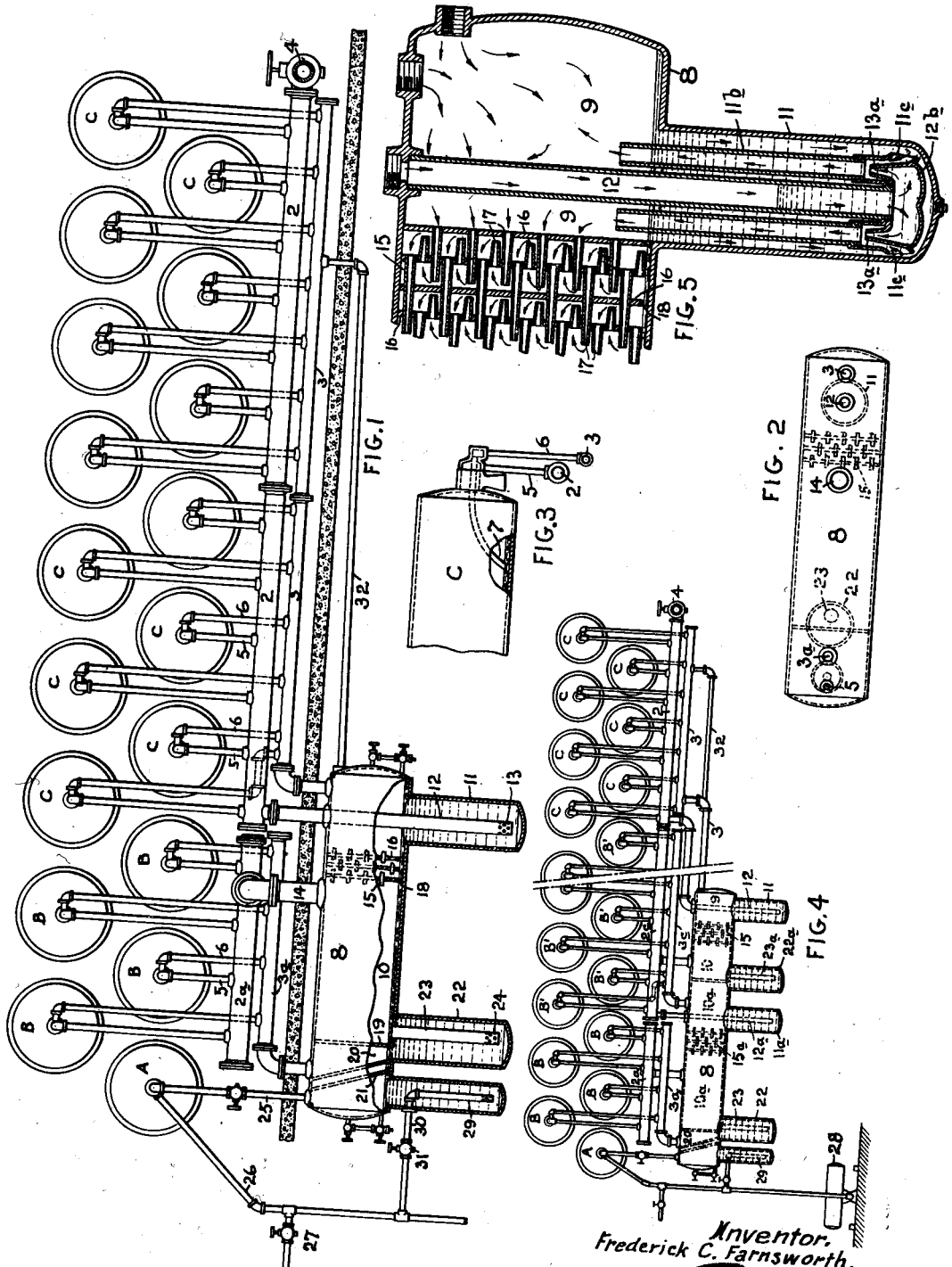
Inventor.
Frederick C. Farnsworth.
By ........
Attorney.

Patented Mar. 18, 1930

1,750,837

UNITED STATES PATENT OFFICE

FREDERICK C. FARNSWORTH, OF BALA, PENNSYLVANIA

DRYING SYSTEM

Application filed March 8, 1929. Serial No. 345,287.

My invention has particular reference to an improved method of drying especially adapted for drying paper and paper board or materials which contain a large percentage of moisture, and moreover, must be dried while traveling at a high speed.

This application is, in part, a continuing application of my application Serial No. 113,168, filed June 2, 1926, for improvement in drying systems.

Fundamentally, my invention embodies a mode of operation which enables steam to blow through the drying cylinders about which the paper is being conveyed from the wet end of the drying system to the dry end thereof, the drying cylinders being kept substantially clear of water of condensation and air, and moreover, wherein the drying cylinders are divided into sections and so coupled with the supply and return headers that the steam is caused to travel in the direction from the dry end section to the wet end section, and in which further, the steam which has passed through the cylinders of one section is delivered to the cylinders of the next section with a predetermined maximum drop in pressure, and so on throughout the system, said steam being preferably at a pressure above that of the atmosphere when supplied to the dryers.

As a further requisite to the successful operation of my improved system, the water of condensation is positively blown out of the drying cylinders under pressure and is separated from the steam in an automatic manner before being fed in its relatively dry condition to the next section of dryers, and wherein also a by-pass is trapped by a water seal between the supply headers of adjacent sections whereby the by-pass will permit the passage of steam from the header of one section into the header of the next cooler section to provide a sufficiency of steam therein whenever the differential in the pressure between the headers of the two adjacent sections shall fall below a predetermined amount, preferably one pound differential.

With the above and other objects in view, the nature of which will be more fully understood from the description hereinafter, the invention consists in the improved method of drying, as hereinafter more fully described and defined in the claims.

Referring to the drawings: Fig. 1 is a side elevation illustrating the principles of construction of a drying system embodying my invention; Fig. 2 is a plan view of one of the water seal and separating tanks; Fig. 3 is a view showing the manner in which the water is blown and siphoned out of the drying cylinders; Fig. 4 is a side elevation corresponding to Fig. 1, but in which there are a plurality of water seal control means when an increased number of sections are employed; and Fig. 5 is an enlarged vertical section showing a modification of the seal and separator shown in Fig. 1.

A, B and C represent the drying cylinders of three sections, said cylinders arranged in the usual form so that the paper or fabric passes successively about the same. The paper in its most wet condition is first received by the drying cylinder A constituting the wet end section. It then passes successively about the cylinders B which constitute an intermediate section, but on account of being adjacent to the wet end of the apparatus as a whole, it may be considered as a secondary wet end section. From these cylinders B, the paper web passes successively about the cylinders C which constitute the dry end section. It will be noted that there are more cylinders C in the dry end section than cylinders B in the secondary wet end section, and more cylinders in the latter than in the case of the cylinder A constituting the primary wet end section. While only one cylinder is shown at A, more than one may be employed, if so desired.

The greatest condensation of steam per cylinder takes place in the cylinder A and the least condensation per cylinder occurs in the cylinders C of the dry end section. With a given supply of steam to the cylinders C, it is manifest that after certain condensation takes place therein there is less steam passing to the cylinders B of the next section; and as at this section the paper is more wet, it is manifest that there is a greater drying duty upon the cylinders B than upon the cylinders C, and as there is less steam than was supplied to the dry end cylinders, it follows that there must be lesser number of the B cylinders to normally operate with the steam which is uncondensed in the cylinders C and passed into the cylinders B. Similarly, as the uncondensed steam from the cylinders B is the source for the steam for the wet section of which A is a cylinder, it naturally follows that the cylinder or cylinders of this wet section must be less in number than the cylinders B of the secondary wet end section. The numbers of the cylinders in each section are proportioned to suit the particular requirements of the mill and, at the same time, to insure a constant maximum differential in the steam circulation through the cylinders of the several sections, that is to say, if the differential between the supply and return headers of the dry end section (formed by the cylinders C) is one pound, then the differential between the supply and return headers of the secondary wet end section (formed by the cylinders B) should also be one pound; and similarly, the differential between the supply and return headers of the wet end section (formed by the cylinder A) should be at least one pound, for the most efficient operation.

My improved apparatus and method is designed to maintain this constant differential of one pound through the various cylinders of all sections, whereby an efficient drying of the paper is insured by reason of the fact that the steam, whether from exhaust or otherwise, may pass through all of the cylinders under substantially the same differential and thereby supply a maximum quantity of steam with a minimum differential across the cylinders. Under these conditions, the cylinders are kept practically free from objectionable water of condensation and the steam flows freely through the same under a substantially constant differential, blowing out the water and air and maintaining the dryer as an efficient drying element.

2 is the main or supply header to the dry end section and 3 is the return header therefor. The drying cylinders are supplied with steam from the header 2 through vertical pipes 5 communicating with the interior of the cylinders C through hollow journals, and the water of condensation and air together with steam are blown out of the cylinders through siphon pipes 7 (Fig. 3), and by vertical pipes 6 find their way into the return header 3. It is desirable that the end of the siphon pipe adjacent to the bottom of the interior of the cylinder shall be provided with small orifices which will readily permit the passage of water and air under the steam pressure but will retard a needless passage of steam along with the water and air. The source of steam supply may be exhaust or live steam or combinations of both, and its supply may be controlled or admitted through a suitable valve 4 into the header 2. The return header 3 discharges into the upper part of a chamber 9 formed at one end of the tank 8 and into which the steam, air and water are driven under the differential pressure existing between the supply and return headers.

The secondary wet end section is provided with a steam supply header $2^a$ and a return header $3^a$ and said headers are similarly connected with the dryers in the same manner as in the case of the dryer C. The steam supply header $2^a$ is connected by a pipe 14 with a chamber 10 of the tank 8 and said chamber is separated from the chamber 9 by a suitable baffle means 15 which preferably consists of transverse plates 16 having short tubes 17 extending through them and the tapered tubes of adjacent plates staggered, as indicated in Fig. 5, to provide baffle interference to the steam passing from chamber 9 to chamber 10, whereby entrained water is released from the steam and thrown down, with the result that the steam passing from the return header 3 through chamber 9 and thence into the supply header $2^a$, is in a more or less dry condition.

By the arrangement of tapered tubes 17 and baffle plates 16 shown, the steam is caused to reverse its flow a number of times and impinge upon a plurality of the baffle plates 16, in passing through the baffle means as a whole. This construction insures a large removal of entrained water and moisture.

As the demand for steam fluctuates according to the consistency of stock, weight of paper to be dried and speed of machine and, furthermore, as the amount of steam that may be obtained from the siphon pipes of any group of dryers is an uncertain and unknown quantity, it is absolutely necessary, therefore, to have some reliable method of supplying additional steam direct to supplement the deficiency of steam obtained from siphon pipes between sections. To maintain uniform temperature in the paper machine, it is necessary to control this variation of demand instantly, automatically and accurately. To accomplish this, I employ a water sealed connection between the supply header 2 and the chamber 9 of the tank 8, and comprising a well 11 having a vertical steam pipe 12 connected at the top to the supply header 2 and having its bottom end provided with apertures 13 through which the steam may escape into the chamber 9 whenever the pressure differential across the headers $2^a$ and $3^a$ increases above the predetermined normal for which the system is designed. Experience has shown that with a properly designed system, a pressure differential of one pound is a practical provision, though it will be understood that this differential may be increased or decreased merely by the lengthening or shortening of the pipe 12 whereby it extends down into the well a greater or less extent. Having once determined on the proper differential to meet the special requirements of the system installed, said differential may be maintained thereafter. The apertures 13 at the lower end of the water sealed pipe 12 are provided so that when the seal is broken for by-passing steam from the header 2 through the chamber 9 and into the header 2ª of the next section, the breaking of the seal will be gradual so that the steam will be similarly admitted and thereby its amount regulated automatically to meet the particular requirements from moment to moment, where the differential in the secondary wet end section was creating a greater differential than the predetermined amount provided for. The breaking of the seal to by-pass the steam would only occur when the condensation in the cylinders B was so rapid as to created a larger differential between the headers 2ª and 3ª than the one pound differential or whatever had been predetermined. Therefore, any demand of steam causing a drop in pressure in the separator beyond that which the water seal is set for, causes the seal to break and allow a sufficient volume of steam to pass from steam header into separator until the predetermined pressure is attained when the water seal again closes. This seal makes and breaks constantly in the process of maintaining the uniform pressure difference between sections.

What has been said in respect to the maintenance of a differential between the dry end section and the secondary wet end section will also apply as between the wet end section and the secondary wet end section respectively comprising the drying cylinders A and B. The wet end section comprising the cylinder A is not shown as having a supply header and a return header because only one cylinder is shown, and the supply pipe 25 and the return or discharge pipe 26 are the equivalent of said headers 2ª and 3ª, as such pipes would be respectively connected into mains similar to said headers if the wet end section comprised two or more cylinders.

The tank 8 is further provided with a division plate 19 which forms another chamber 20 at the opposite end of the tank and into this chamber the return pipe 3ª discharges. The supply pipe 25 for supplying steam to the wet end section A also communicates with this chamber 20 and by which steam from the return 3ª is supplied to the pipe 5 and thence to the dryer A. The chamber 20 may be divided by baffles 21 which are shown as simple plates with perforations, but said baffles may be made as indicated at 15 or may be omitted altogether, if so desired.

To take care of the additional steam which may be required to be passed from the supply header 2ª to the pipe 25 of the wet end drying cylinder A to maintain the predetermined differential of one pound where the condensation in cylinder A was not excessive from any cause, a trap is provided comprising a well 22 and a water sealed pipe 23 opening at the top into the chamber 10 and at the bottom into the lower part of the well through apertures 24, and said well further opening at its top into the chamber 20 so that there is provided a water seal between the chambers 10 and 20 which corresponds in its operation to the water seal provided by the well 11 and pipe 12, before referred to. It will be observed that by this construction, the supply header 2ª is by its pipe connection 14, chamber 10 and water seal (parts 22 and 23) put into communication with the chamber 20 and acts as an automatic means to by-pass steam from the source of the supply header 2ª to the wet end cylinder A. It will also be understood that as the supply header 2ª contains steam at the same pressure as in chambers 10 and 9, it is manifest that, in effect, any excess of steam which may be temporarily required may come also from the return header 3 of the dry end section and even from the supply header therefor where the demand is such as to supply such steam through the water seal 11, 12. This is important, because the drying cylinders A and B of the first two sections, where the paper is wettest, the amount of steam condensed per cylinder is greatest, and under some conditions, either or both of the two wet end sections might require additional steam greater than what could be supplied by the dry end section return header 3, and in which case, the steam would be supplied directly from the steam header 2 through the water seals 11—12 and 22—23, and simultaneously thereby supplying additional steam to the header 2ª of the B cylinders and to pipe 25 supplying the A cylinder.

From the foregoing, it will be seen that the system is very flexible and that, while each section performs its specific normal function, the wet end or intermediate sections will be quickly responsive in the supply of steam whenever the prearranged differential therein is overcome by excessive condensation of steam where abnormally wet portions of the paper are brought into contact with the cylinders of said sections.

The water seal with its total absence of working parts is the acme of simplicity and performs several important functions, namely, the limiting of any undue pressure reduction between sections and automatically supplying "make-up" steam for reducing velocities in order that water can be effectively separated as it passes through the separating chamber. It automatically maintains the exact pressure drop for which it is set, no more and no less, thereby allowing pressure drop to be correctly maintained regardless of what pressure is carried on paper machine.

The water, air and steam which may pass from the wet end drying cylinder A by pipe 26 may, when the pressure is above atmospheric pressure, be allowed to blow off by the pipe 27 or, if desired, may, when the pressure in cylinder A is below atmospheric pressure, be received in a tilting vacuum trap or other pump device which exhausts the air and condenses the steam and delivers the hot water to a tank or place of storage. As the cylinder A performs the greatest duty per cylinder in drying, it is desirable that the steam which passes into or through the said cylinder shall maintain its pressure to insure the thorough elimination of the water and air set free by the condensation of the steam, and to prevent too rapid an exhaustion of the steam condensation by the vacuum trap or pump 28, I prefer to provide a short circuiting means which comprises the well 29 opening from the bottom of the chamber 20 and into which a seal pipe 30 (opening from return pipe 26) extends and through which steam from the chamber 20 may be directly drawn in case of too much suction or vacuum being produced by the trap or pumping device 28. In this manner, the full absolute blowing force of the steam is maintained in the cylinder A while, at the same time, the water of condensation and air are readily taken care of so that the cylinder remains in a substantially dry condition.

The water of condensation is utilized to maintain the water seals but the excess thereof must be removed and this is accomplished in the following manner. The excess of condensation water over what is necessary to keep the well 11 filled flows along the bottom of the tank 8 through apertures provided in the lower parts of the baffle plates 16, and thence is delivered into the well 22 through the pipe 23. The overflow from the well 23 flows along the bottom of the tank and into the well 29 from which it is sucked by the tilting trap or pump 28, as before described.

Where the system is extended to four or more sections, the water seals, interposed between the sections and at the same time permitting all of the sections to cooperate in drying steam from the initial supply main, may have a single tank divided into the right number of chambers, etc. Such an arrangement is indicated in Fig. 4, in which A, B, B' and C represent drying cylinders of four sections. The sections having the cylinders A, B and C are coupled up with the tanks and water seals in the same manner as illustrated in Fig. 1, but in the case of the additional section B', the same must be coupled into connection with the tank and water seals as shown in Fig. 4, and which, in effect, duplicates the illustration of Fig. 1 which corresponds to the dry end section having the drying cylinders C. In Fig. 4, I have lettered the parts which correspond to Fig. 1 with the same letters of reference, but it will be observed that, in addition to the chambers 9, 10 and 20, there is an additional chamber $10^a$ between the chamber 10 and the chamber 20, said chamber $10^a$ having a well $11^a$ and water sealed pipe $12^a$ connecting with the header $2^c$ of the drying cylinders B', and in which the steam of the corresponding return header $3^c$ discharges directly into the chamber $10^a$, and which, after passing through baffles $15^a$ is delivered to the supply header $2^a$ of the secondary wet end section. Furthermore, an additional water seal comprising a well $22^a$ and sealed pipe $23^a$ may be provided between the chambers 10 and $10^a$ to permit the passage of water and, at the same time, to permit, under a greater than normal differential, the passage of steam from the dry end header 2 through seal pipe 12, thence to the header supplying the drying cylinders B', also through the seal pipe $23^a$ into the chamber $10^a$ and to the supply header $2^a$ of the section having the drying cylinders B, and further, by-passing through the seal pipe 23 and supplying steam to the wet end section having the drying cylinder A, said operations being in addition to the passage of the steam from any return header of one section to the supply header of the next section, and responsive, furthermore, to any variable excessive demands which might come upon the drying cylinders of any one or more of the sections other than the dry end section. In this manner, it will be seen that in addition to the normal action of the steam from the return header of one section to the supply header of the next section in advance, there is the automatic possibility of by-passing steam from the supply header of the dry end section or source to any one or more of the other sections, according to their requirements, and made possible by the fact that this additional steam may be by-passed through the several specially arranged seal pipes $23^a$ and 23 which perform the dual function of permitting such by-passing of the steam as well as for transferring the water from the chamber $10^a$ to chamber 10, and thence to chamber 20 to the discharge well 29.

In Fig. 5, I have shown a modified form which may be employed in connection with the water seals 11, $11^a$, 22 and $22^a$, to make them more positive against being fully broken. If, for any reason or cause, the seal is broken by reason of the steam blowing down in pipe 12 (Fig. 1) forcing all of the water in the leg 11 out of the same the steam would short circuit from the supply header 2 of one section to the supply header $2^a$ of the next section, instead of maintaining a constant pressure difference between them. By employing the improvements shown in Fig. 5, it is impossible for the steam to break the water seal in this manner, because in this case the downwardly extending pipe 12 is provided at the bottom with a head 12$^b$ having upwardly directed nozzles 13$^a$ which open into channels 11$^c$ each having an upwardly discharging tubular structure 11$^b$ extending to the top or thereabouts of the leg or well 11. The channel 11$^c$ opens into the bottom well or leg 11 so that water therefrom may be sucked into the channel and forced upward through the tubular parts 11$^b$. This construction provides a Venturi or ejector effect in the water seal, so that any attempt of the steam rushing down the tube 9 will, by means of the nozzles 13$^a$ and the channel 11$^c$, cause an upward ejection of the water within the tubular portions 11$^b$, and cause a counter-current of water downward in the leg or well 11 and into the channel 11$^c$. In this manner, the tendency to break the water seal under certain actions is prevented, since the steam pressure produces a water circulation which insures the well maintaining a normally sealed condition.

Furthermore, as indicated in Fig. 1, a branch return pipe 32 may drain the return header of water and deliver it to the chamber 9 where a very large number of dry end cylinders are employed, as in large paper making machines for the manufacture of paper board.

The fundamental principle of a good paper drying system is to remove all water from the inside surfaces of the dryers as fast at it accumulates, owing to the fact that the maximum heat transfer cannot be obtained when any heat resisting elements such as water, air and oil are present. The cold, wet paper passing over the dryers is the condensing medium for inducing the heat through the shell of the dryers, and it will travel through the cast iron shell greatly faster when insulating films, such as water and air are removed. Therefore, an efficient drying system must be one that will quickly remove these objectionable elements from every dryer as they accumulate on the inside surfaces.

The siphon pipes 7 of the drying cylinders should have their ends extended down as close to the bottom of the dryer as possible, so that the cylinders may be maintained comparatively clear of water of condensation and the steam permitted to blow through under the pressure differential existing between the supply and return headers with sufficient freedom to not only insure the proper heating of active steam, but also to insure the passage of enough steam into the return manifold, as will be necessary to supply the normal requirements of the succeeding sections in the direction toward the wet end section of the system. The water seal features for by-passing the steam from one section to another when the differential between the pressure in the supply and return mains of any section exceeds the predetermined amount are automatic in maintaining the working differential of the respective sections when abnormal conditions arise wherein additional steam must be by-passed from the source or dry end section. The depth of the water seal determines the maximum differential and it is evident that while it is desirable that the working differential shall be the same in each section, nevertheless, the water seals may be of different depth whereby a greater working differential may be provided for one or more of the sections, such as the wet end or secondary wet end sections, for example, as indicated in Fig. 4.

By employing a large tank into which the return header of the dry end section discharges and in which the pressure is approximately one pound lower than the initial pressure of the supply header of the section, it is important that the pressure in the tank shall not drop lower than this predetermined amount, because the speed of flow of the steam through the tank would increase to such an extent that the separator therein would not separate the water from the steam and, therefore, the steam being supplied to the next section would not be sufficiently dry to give the best results. In other words, if steam were to flow through the separator at a velocity greater than ten thousand feet per minute, the entrained and suspended water carried with steam would not be eliminated, and consequently, while I do not limit myself to one pound differential, it is desirable that the differential shall not be higher than would insure a proper flow of steam through the siphon pipes to cause the system to operate normally and, at the same time, permit the proper elimination of water from the steam so that the steam supply to each section will be comparatively "dry". Furthermore, it is evident that where the steam velocity is not too great, the baffles may be in sufficient number to insure thorough elimination of the water from the steam.

The use of water seals in connection with the by-passing of steam to take care of abnormal condensations removes all guess work in operation as they automatically control the drop in pressure in the tank whereby it shall not exceed the predetermined amount while automatically supplying the make-up steam necessary to insure the proper supply of steam to the wet end drying cylinders, even if the siphon pipes of the dry end cylinders should supply insufficient steam to the return header to meet the requirements of the remaining portions of the system.

My improved system is simple in construction in that it avoids the necessity of mechanical appliances such as valves and independent traps on each of the drying cylinders and, moreover, utilizes the water of condensation as a constant means for maintaining the operativeness of the differential seals; and, furthermore, the system is so constructed that the steam may be maintained in a comparatively dry condition notwithstanding that it is repeatedly used in the respective sections and, therefore, is efficient as a drying medium.

I have described my improvements suitable for putting the same into practice in that particularity which I deem to be the best exposition of my invention, and that which I prefer in commercial practice, but I do not restrict or confine myself to the minor or secondary details, as such are susceptible of modification which may be resorted to as matters of mechanical skill and without a departure from the spirit of the invention.

Having thus described my invention, what I claim and desire to secure by Letters Patent is:

1. The herein described automatic method for supplying steam to a series of drying cylinders arranged in sections over which paper or other material in web form travels successively while being dried, which consists in supplying steam to the cylinders of the dry end section from which the web to be dried passes in its dried condition, separating the steam and water of condensation which passes from the said drying cylinders and delivering the uncondensed steam into another portion of the drying cylinders of a section nearer to the wet end of the apparatus, and similarly separating the water of condensation from the steam as it passes from said cylinders, and finally supplying the uncondensed steam to one or more cylinders at the wet end section or where the web to be dried is in its wettest condition, and wherein further, the steam is circulated from the cylinders of one section to the cylinders of the next section nearer the wet end and so on from section to section at a substantially constant pressure differential by supplying the steam from the supply side of the cylinders of one section through a water seal and static head to the supply side of the next section of cylinders whenever the differential between successive sections shall increase materially above the predetermined static head and differential thereby to be maintained.

2. The method according to claim 1, wherein the steam which passes from the returns of one section to the supply of the next section is mixed with the steam which is delivered directly from the steam supply of the section from which the returns are delivered after passing through the water seal and static head thereof and causing the suspended water to be separated from said steam mixture before the steam is supplied to the supply side of the next section.

3. The method according to claim 1, wherein the steam which passes from the returns of one section to the supply of the next section is mixed with the steam which is delivered directly from the supply of the section from which the return are delivered after passing through the water seal and static head thereof, separating the suspended water from said steam mixture before the steam is supplied to the supply side of the next section, and causing the water separated from the steam delivered to the successive sections to flow through the water seals successively in a direction from the dry end of the system toward the wet end thereof and be finally removed.

4. The method according to claim 1, wherein the steam which passes through the water seal is utilized to provide a suction upon the water at the lower part of the seal to insure the closing of the water seal with water to prevent the breaking of the seal when an excess of steam passes.

5. The method according to claim 1, wherein the water seal is formed by an upwardly moving current of water and steam and a downwardly moving current of water commingling with the upwardly moving current of water and steam at its bottom so that said downwardly moving current of water is caused to move upwardly with the current of steam and water to insure a constant sufficiency of water with the steam current to prevent the breaking of the seal formed thereby.

6. The method according to claim 1, wherein the water seal is kept substantially constant by injecting into the water seal at its bottom a current of water.

7. The method according to claim 1, wherein further, the steam in passing from the water seal to the next dryer means is caused to be reversed upon itself and to be compressed and expanded alternately to assist in eliminating the entrained or suspended moisture therefrom.

In testimony of which invention, I hereunto set my hand.

FREDERICK C. FARNSWORTH.